(12) United States Patent
Arai

(10) Patent No.: US 10,859,254 B2
(45) Date of Patent: Dec. 8, 2020

(54) LUMINOUS PROTECTIVE FENCE

(71) Applicant: SUNLIGHT CO., LTD., Hyogo (JP)

(72) Inventor: Kazushige Arai, Hyogo (JP)

(73) Assignee: SUNLIGHT CO., LTD., Himeji (JP)

( * ) Notice: Subject to any disclaimer, the term of this patent is extended or adjusted under 35 U.S.C. 154(b) by 0 days.

(21) Appl. No.: 16/742,300

(22) Filed: Jan. 14, 2020

(65) Prior Publication Data

US 2020/0149734 A1    May 14, 2020

(30) Foreign Application Priority Data

Jun. 27, 2017  (JP) .................................. 2017-124817

(51) Int. Cl.
| | |
|---|---|
| *E04H 17/14* | (2006.01) |
| *F21V 33/00* | (2006.01) |
| *F21S 9/03* | (2006.01) |
| *F21Y 115/10* | (2016.01) |
| *F21W 131/103* | (2006.01) |

(52) U.S. Cl.
CPC ....... *F21V 33/006* (2013.01); *E04H 17/1413* (2013.01); *F21S 9/035* (2013.01); *F21W 2131/103* (2013.01); *F21Y 2115/10* (2016.08)

(58) Field of Classification Search
None
See application file for complete search history.

(56) References Cited

U.S. PATENT DOCUMENTS

2008/0099751 A1\*  5/2008  Chen ................... F21V 21/0824
256/19

FOREIGN PATENT DOCUMENTS

| JP | 2003-27438 A | 1/2003 |
|---|---|---|
| JP | 2005-266497 A | 9/2005 |

\* cited by examiner

*Primary Examiner* — Elmito Breval
(74) *Attorney, Agent, or Firm* — IP Business Solutions, LLC

(57) ABSTRACT

To provide a luminous protective fence without the use of an external source, this inventive protective fence is designed to have a sunlight receiving and a light emitting function structure as well as a pipe strength. The fence comprises multiple transverse pipes made from a metal or rigid material comprises an upper opening which is sealed with a light transmitting cover (12A). The solar panel (21) is installed under the light transmitting cover (12A) and also the metallic pipe is provided with a controller (22), a battery (23) and an output circuit (24), while the metallic pipe is provided with a recessed groove (25) exposing diagonally downside and extending in a longitudinal direction, and in the recess a luminescent module (25) is installed, thereby during the daytime the sunlight energy is stored through the solar panel (21) in the battery (23), while during the nighttime the controller (22) provides the electric power from the battery (23) to the output circuit (24) to emit the light from the luminescent module (25), resulting in provision of a luminescent protective fence in order to illuminate the pedestrian's feet.

4 Claims, 4 Drawing Sheets

LUMINOUS PROTECTIVE FENCE

BACKGROUND OF THE INVENTION

Fields of Invention

The present invention relates to a luminous protective fence (hereafter referred as a light emitting boundary fence), specifically to a protective fence standing at the boundary for separation between a road and a walkway, which is provided with a transverse pipe having a strength sufficient for a protective fence and a light emitting ability to notice the presence of a boundary fence or to illuminate a road boundary for pedestrians and drivers.

Description of Related Art

For example, it is necessary to build a protective fence for separation or boundary between a road and a walkway and also for making a protective boundary from a park or a river to prevent pedestrians or bicycles from falling into a dangerous zone accidentally.

However, almost usual protective fences cannot be illuminated or visualized at night without streetlights, etc., so the protective fences without streetlights may be not so useful and cannot prevent the accidents during the night.

Up to now, some illuminating boundary protective fences have been proposed. In one of them, the fence is provided with a longitudinal steel tube having a concave groove formed longitudinally on the outer surface of the steel tube, wherein a rod-shaped light-emitting member is mounted in the concave groove, and a light-emitting source is positioned in a position opposite to the edge surface of the light-emitting member, so that the light is emitted from the edge surface of the light-emitting member (Patent document 1).

In addition, there has been proposed an illuminating hand-slip, in which a transparent or translucent hollow cylinder tube is provided with a substrate for placing a connection between a power source and a control signal, and for mounting a LED panel on a hollow cylinder tube (Patent document. 2).

Patent document 1. JP-A-2003-27438
Patent document 2. JP-A-2005-266497

SUMMARY OF THE INVENTION

Technical Problem

However, the above mentioned light-emitting protective fence in Patent document 1, is provided with a light-emitting source placed in a position opposite to the edge surface of the rod-like light-emitting member, so that the light emitting source is necessary to provide a power from an external source. On the other hand, the above mentioned hand-slip in Patent document 2, has not a sufficient strength due to the material and the structure, so that it is difficult to use as the protective fence for separating the walkway from the road and also for making the boundary of the park and river.

In view of such above problems, the subject matter of the present invention is to provide a light-emitting boundary protective fence that does not require an external source and ensures the necessary strength for keeping protection of boundary fence.

Solution to Problem

Thus, a light-emitting protective boundary fence according to the present invention has a protective fence structure having an ability to keep the necessary strength and illuminating the position where multiple transverse pipes bridged with space apart from each other in a vertical direction between a pair of adjacent vertical struts or supports standing on a ground. The light-emitting transverse pipes have an upper opening for receiving a sunlight and is provided with a solar panel, which is sealed with a light-transmitting cover. The solar panel can be placed on the lower pipe and sealed under the light-transmitting cover, and the lower part of the light-emitting transverse pipes is closed and provided inside with a controller, a battery and an output circuit built-in under the solar panel. On the other hand, the lower metallic half pipes of the luminescent transverse pipes have a groove that extends longitudinally on the external surfaces and opened diagonally below. A light-emitting module is installed in the groove and illuminating diagonally below, Therefore, during the daytime the sunlight power is stored through the solar panel power into the battery, On the other hand, during night the controllers give the power from the battery to the output circuit, so that the light is emitting from the light emitting module. Therefore, according to an embodiment of the first invention, A light emitting or luminous boundary fence which comprises multiple vertical struts or supports (11) to stand on a ground with space apart from each other in the transverse direction and multiple transverse pipes (12), (13) bridged between a pair of adjacent vertical struts or supports (11) with space apart from each other in the vertical direction, wherein the transverse pipe (12) comprises an upper half opened pipe and a lower half closed pipe to be coupled into one pipe body, the lower half pipe is made from a metallic or rigid material for keeping a pipe strength and making an equipment built-in room and the other upper half is a light transparent opened pipe or cover (12A) for making a sunlight receiving room; and wherein the sunlight receiving room is provided with a solar panel (21) and the equipment built-in room is provided with a controller (22), a battery (23) and an output circuit (24), while the rigid material pipe (12B) of the light emitting transverse pipe (12) has a recessed groove exposing diagonally downside and extending in a longitudinal direction, in which recess a light emitting module (25) is installed, thereby during the daytime the sunlight energy is stored through the solar panel (21) in the battery (23), while during the nighttime the controller (22) provides the electric power from the battery (23) to the output circuit (24) so as to emit the light from the light emitting module (25).

According to the invention, it is important that the light emitting or luminous longitudinal pipe applicable to a transverse pipe attached to a light emitting or luminous boundary fence, which comprises an upper half opened pipe and a lower half closed pipe to be coupled into one pipe body, the lower half pipe is made from a metallic or rigid material for keeping a pipe strength and making an equipment built-in room and the other upper half is a light transparent opened pipe or cover (12A) for making a sunlight receiving room;

and wherein the sunlight receiving room is provided with a solar panel (21) and the equipment built-in room is provided with a controller (22), a battery (23) and an output circuit (24), while the rigid material pipe (12B) of the light emitting transverse pipe (12) has a recessed groove exposing diagonally downside and extending in a longitudinal direction, in which recess a light emitting module (25) is installed, thereby during the daytime the sunlight energy is stored through the solar panel (21) in the battery (23), while during the nighttime the controller (22) provides the electric power from the battery (23) to the output circuit (24) so as to emit the light from the light emitting module (25)

One of the characteristics of the present invention is that the light-emitting transverse pipe has a sunlight receiving room and an equipment built-in room and is made from 2 parts: one is an metallic or rigid material closed half pipe and the other is a light-transmitting opened half pipe or cover. The closed half pipe may be made from an opened half pipe and a plate for sealing the opening of the pipe. According to the present invention, the strength of light-emitting transverse pipe can be obtained by the metallic or rigid material half pipe structure. Therefore, the structure can be fully adopted for protective fences that separate the walkway from the road and make the boundaries of parks and rivers. Especially, the strength can be further improved by the cross-sectional circular shape in the light-emitting transverse pipes.

The second feature of the present invention is that a solar panel is placed on the upper area of the metallic or rigid material half pipe and sealed under the light-transmitting half pipe or cover to be coupled with the lower metallic or rigid material closed half pipe, and under the solar panel, there is a water-tight room where a battery, a controller and an output circuit are built-in, while a light-emitting module is installed in the outside groove of the half pipes, preferably sealed by transparent or translucent polycarbonate resin cover, thereby allowing the sideways to be lighten without the use of an external source, which can guide pedestrians and make drivers and pedestrians to ensure the safety of driving or walking.

For example, transparent or translucent polycarbonate resin half or less (less means the sectional arc angle is 180 or less degrees, preferably 90 to 180 degrees) pipe can be used for the upper light-permeable covers, while aluminum or aluminum alloy half pipe can be used for the lower metal half closed pipes.

DETAILED DESCRIPTION OF THE PREFERRED EMBODIMENTS

Figure 1:
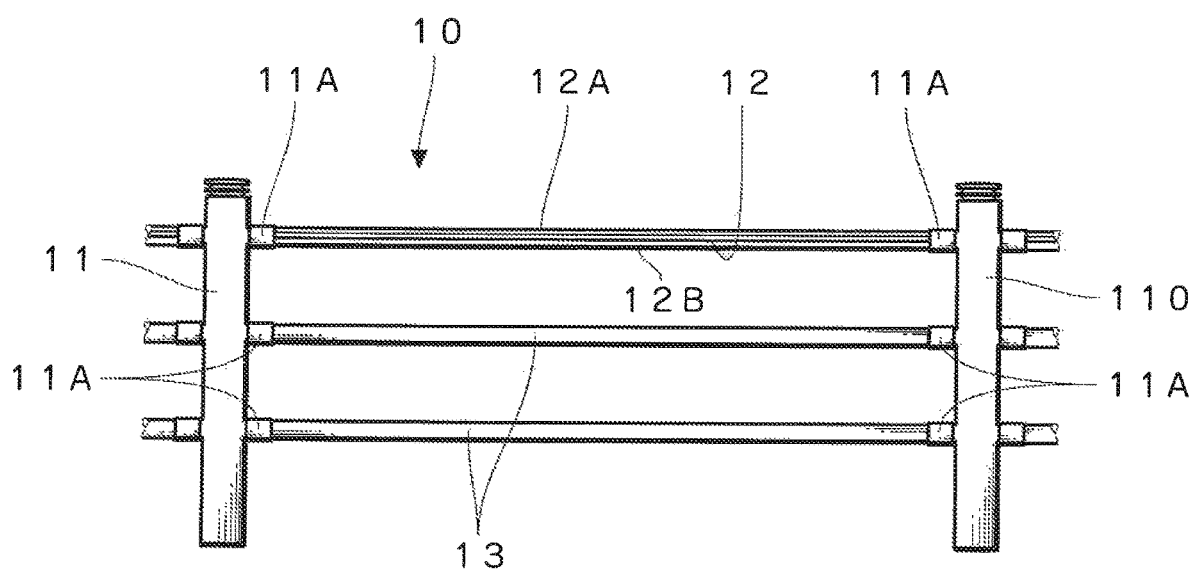
FIG. 1 is a schematic front view showing the preferred embodiment of the luminescent protective fence according to the present invention.
Figure 2:
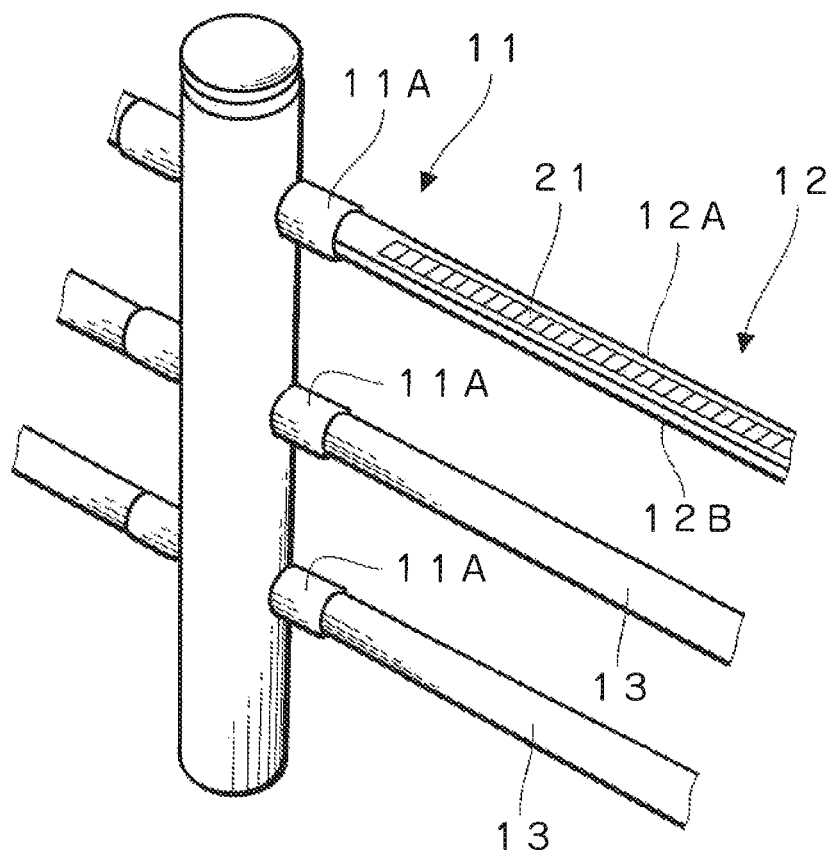
FIG. 2 is the strabismus summary showing the above embodiments.
Figure 3:
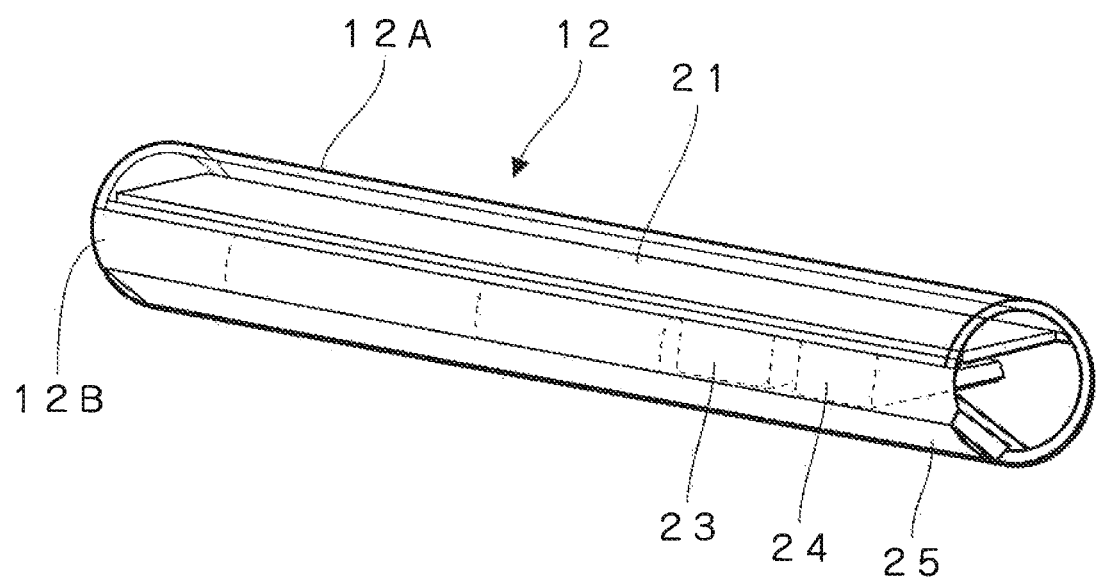
FIG. 3 shows the structure of the luminescent transverse pipes in the above embodiments.
Figure 4:
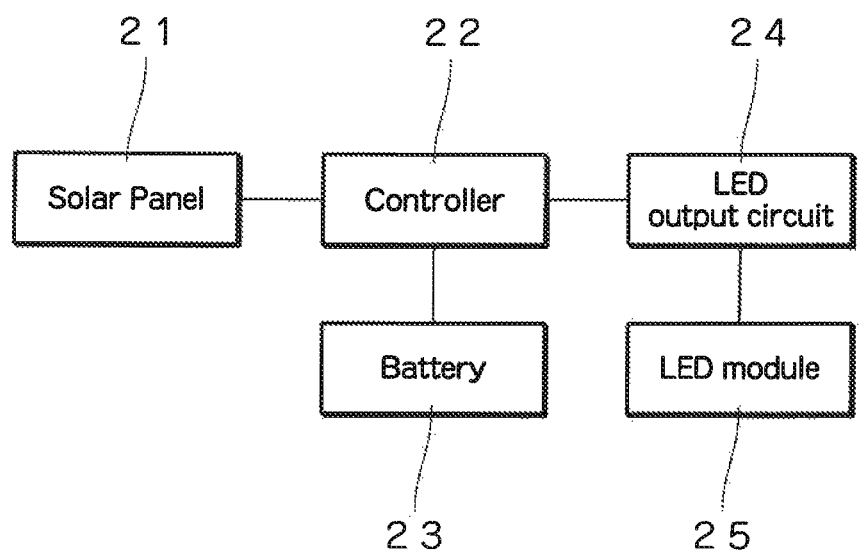
FIG. 4 shows the functional block in the above embodiments.

Embodiments of the present invention are hereafter described with reference to the drawings. FIG. 1 to FIG. 4 show the preferred embodiment of the light emitting protective fence according to the present invention. In the figure, the light emitting protective fence 10 is composed of three transverse pipes 12 and 13 spaced up and down between a pair of the right and left vertical struts 11 made of aluminum alloy, and steel tube can be used for the transverse pipes 13 in the lower two rows.

The vertical strut 11 is anchored with a piped attachment bracket 11A, and the attachment bracket 11A is inserted with both ends of the lateral pipes 11 and 12, which are tightened and fixed by appropriate fixation means such as screws and bolts (as not shown).

The top transverse pipe12 has a luminescent or light emitting function; the luminescent transverse pipe12 is made from the upper opening of the semi-pipe12B of aluminum which is sealed with a clear or translucent polycarbonate resin light-permeable cover 12A, and the cover12A and semi-pipe12B are adhered by glue to form a water-tight structure.

A solar panel 21 is interdigitated on the lower side of the light-transmitting cover 12A of light-emitting transverse pipe12, and a controller 22, a battery 23 and an output circuit 24 are incorporated on the lower side of solar panel 21 in light-emitting transverse pipe12. The lateral side of metallic semi-pipe12B of light-emitting transverse pipe12 has an incarcerated groove formed longitudinally, and the incarcerated recess groove is interdigitated with LED light-emitting module 25 to deliver light downward obliquely.

The controller 22 stores power from the solar panel 21 in the battery 23 during the daytime, and at night the power of the battery 23 is output to the LED output circuit 24 to emit light from the LED emission module 25.

Here, the controller 22 may be composed by a usual CPU or the like and may also be composed of a sequencer. Switching of LED emission module 25 between daytime and nighttime may also be automatically lights on and off respectively during daytime and nighttime, for example by comparing the power generation in the solar panel 21 with the predetermined threshold, and may be automatically lights on and off respectively during daytime and nighttime by control of timer.

The light-on time of LED light emission module 25 may also be optionally selected by the user, and the light-on time may be controlled according to the power output of the battery 23 by the CR circuit.

As shown above, the high strength of the metallic semi-pipes 12B and the cross-sectional circular shape of the pipes provide a sufficient strength and can be adopted for protective fences that separate between the road and between the walkway and the boundary of parks and streams.

In addition, the light-transmitting cover 12A was adopted, and the solar panel 21 is placed on the top of the closed half pipe, and the battery 23, the controller 22, and the LED output circuit 24 are built-in on the lower side thereof, so that the LED light-emitting module 25 is placed longitudinally on the lateral surface of the metal semi-pipe12B. Therefore, the total of the lateral pipes 12 could be brightened without using an external source, and the pedestrians could be guided, and the safety of the passage could be ensured.

DESCRIPTION OF REFERENCE NUMERALS

10: Luminous protection fence
11: Vertical strut
12: Light-emitting transverse pipe
13: Transverse pipe
12A: light permeability cover
12B: metallic half pipe
21: Solar panel
22: Controller
23: Battery
24: LED output circuit
25: LED module

The invention claimed is:
1. A light emitting or luminous protective fence comprising:
at least two vertical struts or supports to stand on a ground with space apart from each other in the transverse direction; and at least two transverse pipes bridged between a pair of adjacent vertical struts or supports with space apart from each other in the vertical direction, wherein at least one of the transverse pipes includes an upper half opened pipe and a lower half closed pipe to be coupled into one pipe body, the lower half closed pipe is made from a metallic or rigid material for keeping a pipe strength and making an equipment built-in room, and the upper half opened pipe is a light transparent opened pipe or cover for making a sunlight receiving room;

wherein the sunlight receiving room is provided with a solar panel, and the equipment built-in room is provided with a controller, a battery and an output circuit, the lower half closed pipe of the at least one of transverse pipes has a recessed groove exposing diagonally downside and extending in a longitudinal direction, and in the recess groove, a light emitting module is installed, and during the daytime, the sunlight energy is stored through the solar panel in the battery, and during the nighttime, the controller provides the electric power from the battery to the output circuit so as to emit the light from the light emitting module to deliver light downward obliquely from the transverse pipe extending in a longitudinal direction.

2. The light emitting or luminous protective fence according to the claim 1, wherein the upper half opened pipe or cover of the at least one of the transverse pipes is made from a translucent polycarbonate resin and the like, and the lower half closed half pipe of the at least one of the transverse pipes is made from aluminum alloy or the like.

3. A light emitting or luminous longitudinal pipe applicable to a transverse pipe attached to a light emitting or luminous protective fence, comprising:

an upper half opened pipe and a lower half closed pipe to be coupled into one pipe body, wherein the lower half pipe is made from a metallic or rigid material for keeping a pipe strength and making an equipment built-in room and the upper half opened pipe is a light transparent opened pipe or cover for making a sunlight receiving room, wherein the sunlight receiving room is provided with a solar panel, and the equipment built-in room is provided with a controller, a battery, and an output circuit the lower half closed pipe of the transverse pipe has a recessed groove exposing diagonally downside and extending in a longitudinal direction, and in the recess groove, a light emitting module is installed, and during the daytime, the sunlight energy is stored through the solar panel in the battery, and during the nighttime, the controller provides the electric power from the battery to the output circuit so as to emit the light from the light emitting module to deliver light downward obliquely from the transverse pipe extending in a longitudinal direction.

4. The illuminative pipe according to the claim 3, wherein the upper half opened pipe of the transverse pipe is made from a translucent polycarbonate resin or the like, and the lower half closed pipe of the transverse pipe is made from aluminum alloy or the like.

* * * * *